UNITED STATES PATENT OFFICE.

ALEXANDER H. EVERETT, OF SAN FRANCISCO, CALIFORNIA.

DRIER FOR PAINTS.

SPECIFICATION forming part of Letters Patent No. 247,031, dated September 13, 1881.

Application filed July 30, 1880. (Specimens.)

*To all whom it may concern:*

Be it known that I, ALEXANDER H. EVERETT, of the city and county of San Francisco, and State of California, have invented a Drier for Paints; and I hereby declare the following to be a full, clear, and exact description thereof.

My invention relates to an improved drier to be used for paints and oils; and it consists of borate of lime.

Many substances have been employed to mix with paints, linseed and other oils, and many others are well known which might be valuable for this purpose, but on account of their high prices they cannot be used. Among the powerful driers is the borate of manganese; but it is objectionable on account of its cost, and also because it discolors the paint if used in any great quantities.

I am also aware that sulphate of manganese has been employed with salts of zinc for the same purpose.

In my invention I take borate of lime, which is largely found as a native product in some parts of the country, or I may use the artificial product with equally good results. This substance is a good drier for oils and paints, and by the addition of sulphate or acetate of manganese the effect is much increased.

To prepare my drier I use the articles in the following proportions, which I have found good, although they may be varied without materially lessening the action: I take one hundred pounds of borate of lime, which is pulverized, and to this I add ten pounds of dry powdered sulphate or acetate of manganese. The whole is then thoroughly mixed, and it forms a white powder, which may be mixed with the paint at once; or, if preferred, it may be ground in oil and used as any of the ordinary driers.

It will be manifest that the proportions here given may be varied considerably without altering the results materially.

By this combination I produce a drier all of the ingredients of which have good drying qualities, instead of having a mixture with a large quantity of foreign and inert matter in it.

I am aware that highly-colored borates of metals have been prepared from borate of lime to serve as pigments. I am also aware that borate of lime has been used as a source for obtaining borax and boracic acid, and as a substitute for borax when used as a flux. I am also aware that borate of magnesia has been known as a drier for oils. These I do not claim. The drier prepared by my invention is of a neutral tint, and may be used with paints of all colors without injury or modifying those colors.

Having thus described my invention, what I claim as new, and desire to secure by Letters Patent, is—

The combination, with ordinary paints and oils, of a drier consisting of borate of lime, substantially as described.

In witness whereof I have hereunto set my hand.

ALEXANDER H. EVERETT.

Witnesses:
   GEO. H. STRONG,
   S. H. NOURSE.